United States Patent [19]

Marini et al.

[11] 3,798,958
[45] Mar. 26, 1974

[54] METHOD AND APPARATUS FOR EVALUATING THE LUBRICATING CHARACTERISTICS OF OILS AND GREASES

[75] Inventors: Manlio Marini; Oddino Maritano; Franco Foa, all of Torino, Italy

[73] Assignee: Ing. C. Olivetti & C., S.p.A., Turin, Italy

[22] Filed: Apr. 15, 1970
(Under Rule 47)

[21] Appl. No.: 28,822

[30] Foreign Application Priority Data
Apr. 15, 1969 Italy .................................. 51427/69

[52] U.S. Cl. ......................... 73/10, 356/23, 356/70
[51] Int. Cl. ........................................... G01n 33/30
[58] Field of Search ..................... 73/10; 356/23, 25

[56] References Cited
UNITED STATES PATENTS

| | | | |
|---|---|---|---|
| 154,922 | 9/1874 | Stapfer | 73/10 |
| 1,490,603 | 4/1924 | Elverson | 73/10 |
| 3,178,928 | 4/1965 | Howe | 73/10 X |
| 3,599,002 | 8/1971 | Beutelspacher et al. | 356/23 |

Primary Examiner—Richard C. Queisser
Assistant Examiner—Daniel M. Yasich
Attorney, Agent, or Firm—Schuyler, Birch, Swindler, McKie & Beckett

[57] ABSTRACT

A method and apparatus for precisely evaluating the lubricity characteristics of various oils and greases while they are under load and in motion and subject to variations in temperature.

8 Claims, 3 Drawing Figures

METHOD AND APPARATUS FOR EVALUATING THE LUBRICATING CHARACTERISTICS OF OILS AND GREASES

BACKGROUND OF THE INVENTION

1. Field of the Invention

This invention relates to a method and apparatus for evaluating in a practical manner and a precise way the characteristics of lubricating oils and greases while they are subjected to a load and are in motion, thus obtaining information useful in selecting the proper lubricants for a specific use.

2. Summary of the Invention

As is known, the proper operation of mechanical members such as bearings or couplings, especially if under load, is closely related to the type of lubricating oil or grease used. It is therefore frequently necessary and desirable to evaluate exactly how much a lubricant contributes to the ease with which moving members are capable of moving with respect to each other and how this lubricity changes with variations in temperature. A method and apparatus is therefore desirable which permits the evaluation of a lubricant according to its lubricity characteristics under the conditions of varying loads and temperatures.

According to the invention, the following operations are performed in order to determine the lubricity characteristics of the grease or oil used. First, a bearing is lubricated with the oil or grease to be tested. The bearing is carried on a shaft which is itself integral with a stroboscopic disk. Second, the bearing-shaft-disk system is thermostaticized by connecting it to a refrigeration unit. Third, the disk is driven for a predetermined time at a given rotational speed by means of an automatically disengageable clutch. Fourth, counting the number of revolutions of the disk by means of a photoelectric device connected to the stroboscopic disk. The lubricity of the tested material is then evaluated and is a function of the number of revolutions of the disk in the period of time between two stroboscopic effects. In the context of this application the term stroboscopic effects refers to the following phenomenon. The stroboscopic disc is painted in such a way that its surface is divided into thirty sectors, 15 white and 15 black in alternation. During rotation of the disc, each sector occupies the position of the preceding sector after one thirtieth of a disc revolution. Assuming the disc rotates at 500 revolutions per minute it will complete one revolution within one five hundredth of a minute, so that each one thirthieth of a revolution will require one two hundred fiftieth of a second. If during its rotation the disc is illuminated from a lamp by means of a pulsating light having a period of one two hundred fiftieth of a second, the disc will appear to be motionless, because each sector of the disc, as it passes adjacent the light, will appear to be illuminated in the same position as the preceding sector. If the revolution rate of the disc is not constant, or if the pulsation period of the light does not correspond to the displacement rate of each sector, the sectors on the disc will appear to move. In actual practice, the pulsation period of the light will be substantially constant, whereas the rotational velocity of the disc will not be constant. In this case the sectors on the disc will appear to move until their displacement rate is now equal to the value of the flashing rate of the light, at which time the sectors will be observed as being motionless. This is referred to herein as a first stroboscopic effect. By further reducing the revolution rate of the disc, the sectors again will appear to move until their displacement rate is now equal to a submultiple of the pulsation period of the light, when again they will apparently be motionless. This is referred to in here as a second stroboscopic effect.

The apparatus of the invention substantially consists of a conventional bearing carried by a shaft which is itself integral with a steel disk acting as a flywheel. The upper face of the disk is painted so that its surface is divided into 30 sectors, 15 sectors of which are white and 15 of which are black. An opening is provided in the external marginal region of the disk which is preferably a slot which covers an arc of 60° and which is 6 mm in width.

After the bearing is lubricated with the oil or grease which is to be tested, the system is thermostaticized to a predetermined temperature by connecting it to a refrigeration unit. The fly wheel, which may or may not be illuminated by an ultraviolet lamp, is automatically driven for a predetermined time, for example, 5 seconds, and at a rotational speed of, for example, 500 r.p.m. by means of a clutch. The clutch consists of, for example, a rubber disk which is automatically disengageable and is driven by a 0.15 HP three-phase asynchronous motor.

A photoelectric system employing the use of photocells is connected to the stroboscope in order to count the number of revolutions of the flywheel immediately after the clutch is disengaged. The lubricity of the material under test can be evaluated as a function of the number of revolutions of the flywheel between two stroboscopic effects (stroboscopic lubricity) or as a function of the number of revolutions of the flywheel before it comes to a complete rest. More particularly, the stroboscopic disk is illuminated when required by means of a mercury-vapor lamp energized by a 50 Hz alternating current. The light emitted by the mercury-vapor lamp has a pulsation of one one-hundredth of a second. If the disk or flywheel is driven at a rotational speed such that one-thirtieth of a revolution, or a multiple or a submultiple thereof, is accomplished in one one-hundredth of a second, the disk will appear to be standing still. In the period of time of one one-hundredth of a second, the illumination passes from one high point to another and each sector moves to a position previously occupied by an adjacent sector. Conversely, if the disk does not rotate at a constant speed because it is being slowed down by the effect of frictional resistance which is in part due to the viscosity of the oil with which the bearing is lubricated, various sectors appear to slowly rotate in one direction or in the other with the exception that that portion of the disk rotating through an angle determined by a one one-hundredth of a second pulse emitted by the mercury-vapor lamp will appear to be standing still. Taking, as an example, the period between two subsequent stroboscopic effects during which the disk speed is such that it appears to an observer to be standing still, the lubricity of the oil or of the grease under test can be expressed as a function of the number of revolutions of the disk during the period between two stroboscopic effects. The output of the photoelectric system which counts the number of revolutions of the flywheel between the two stroboscopic effects may be automatically recorded on a " Labocord" (registered trademark) unit manufactured by the 'Optica,' Milano, Italy, or the output may be recorded manually.

These and other characteristics of the present invention will become apparent from the following description of a preferred embodiment thereof which is made by way of example with reference to the accompanying drawings.

DETAILED DESCRIPTION OF THE INVENTION

Figure 1:
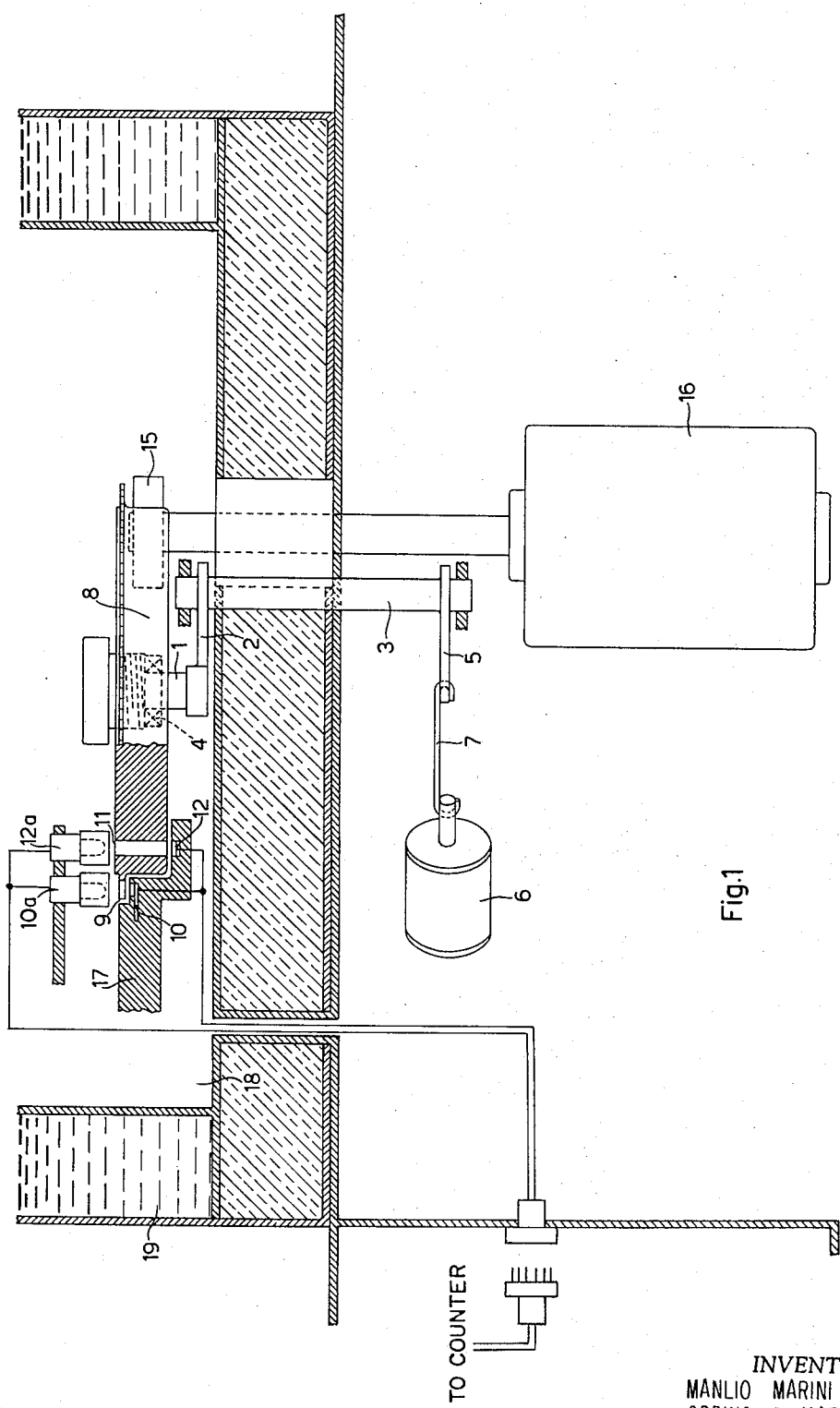
FIG. 1 is a sectional view of the disk-control system of the invention.
Figure 2:
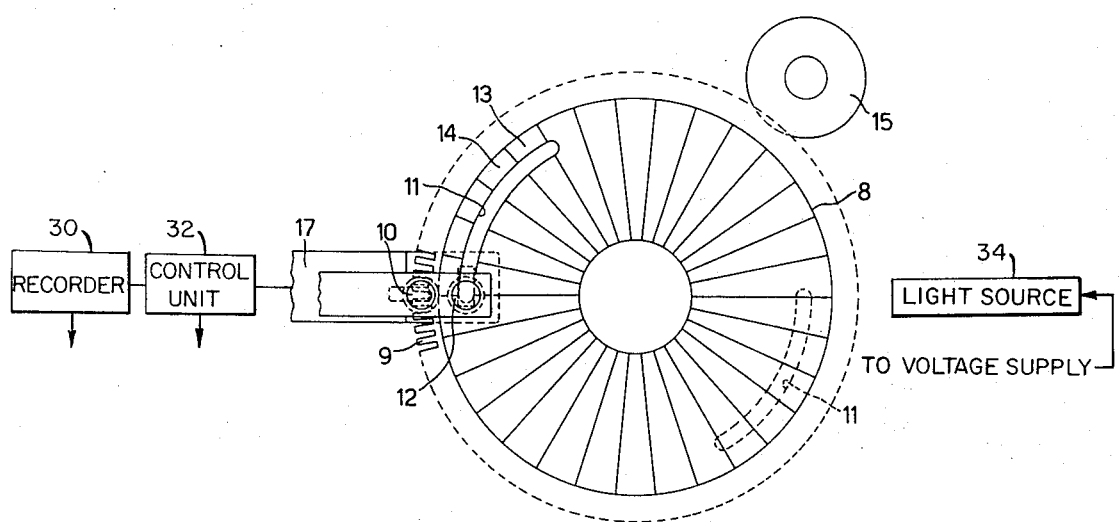
FIG. 2 is a top view of the disk-photocell system of the present invention.
Figure 3:
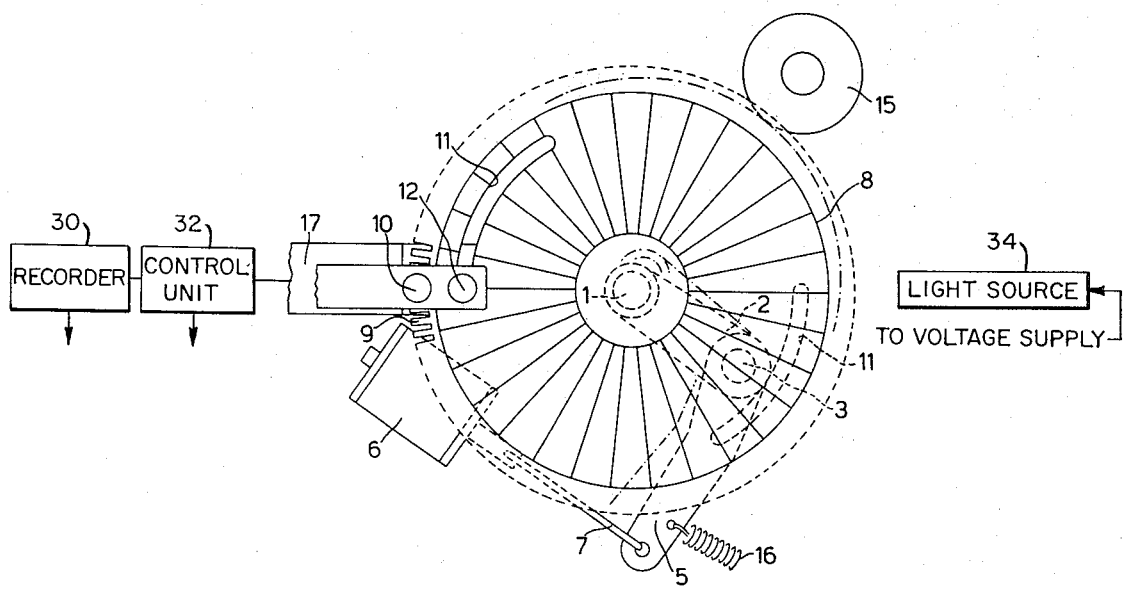
FIG. 3 is a top view of the stroboscopic system in both its starting and opertional positions.

With reference to the drawings, the apparatus of the invention comprises a shaft 1 secured to one end of an arm 2 and extending perpendicular thereto. The arm 2 is in turn secured to a shaft 3 which is rotatably journaled at each of its ends in a conventional manner. The shaft 1 has a bearing 4 mounted thereon, which bearing 4 is lubricated by the oil or grease to be tested during the operational phase of the invention. The arm 2 is operatively connected to an arm 5 by means of shaft 3. The arm 5 is controlled by an electromagnet 6 which is connected to the arm 5 by means of a linkage 7. The bearing 4 is fixed to a steel disk 8 which acts as a flywheel. The dimensions of the steel disk 8 are chosen so that the disk will have a high degree of inertia and will have a high number of revolutions per minute. It should be pointed out that the members indicated by numberals 2, 3, 5, 6 and 7 are not visible as viewed in FIG. 3 and are therefore represented by the use of the phantom dash-line and dot-and-dash line to thereby respectively indicate the position of the flywheel 8 after it has become disengaged with the clutch 15 and the position of the flywheel when it is being driven by means of the clutch 15.

The outer periphery of the disk 8 has indentations or teeth 9. A photocell 10 is positioned in an arm 17 near teeth 9 and receives light from a lamp 10a to provide a series of impulses which can be suitably transformed by a digital measuring unit into linear signals which are then transmitted to a suitable recording unit 30. A slot 11 is provided adjacent the periphery of the disk 8. The slot 11 describes an arc of 60° and is 6 mm in width. The slot 11 is preferable to a single hole through the disk 8 in that at the highest speed of the disk 8 a photocell 12 is thereby capable of receiving a sufficient quantity of light from a lamp 12a to energize a conventional revolution counter included in reorder 30. The top surface of the disk 8, namely that surface facing the operator, is pained in such a way that 30 radially extending triangular-shaped sectors result, 15 of which are black and indicated by the numeral 13 and 15 of which are white, indicated by the numeral 14.

The previously described apparatus of the present invention is connected to a refrigeration unit similar to many well known in the art and has a portion thereof which encircles the entire apparatus to provide a cup-shaped area 18 through which flows the refrigerant liquid. A thermal insulating layer 19 is provided around the cup-shaped area 18. After the desired temperature is reached, the electromagnet 6 is energized to pull arm 5 via linkage 7 to thereby displace the arm 2 of the disk 8 bringing the disk 8 into contact with disk 15. Disk 15 is made of rubber and acts as a clutch which is controlled by a 0.15 HP three-phase asynchronous motor 16. The motor 16 is in turn connected to a timer (not shown) which itself develops a shaft speed of 1,450 r.p.m.

The disk 15 drives the disk 8 at a speed of 500 r.p.m. for a predetermined time at the end of which the electromagnet 6 releases the linkage 7, thereby withdrawing the disk 8 from the disk 15 with the help of spring 16. A control unit 32 permits either manual or automatic reading or recording of the data obtained, activates a revolution counter, and controls the ultraviolet lamp 34 positioned over the disk 8 used in detecting the stroboscopic effect.

Photocells 10 and 12, which are supported by arm 17, enable evaluation of the lubricating oil or grease under test, The photocell 10 counts the teeth 9 by providing an electrical output pulse for each tooth as it passes the photocell 10. The output pulses from the photocell 10 are transformed by a digital measuring unit into a linear signal which is transmitted to a recording unit 30. The speed of the disk 8 is thereby determined and recorded. The photocell 12 counts the number of revolutions of the disk 8 by counting the number of pulses received from lamp 12a through slot 11 and transmits an output pulse corresponding thereto to a revolution counter whereby the lubricity of the oil or grease under test can be evaluated. The lubricity of the lubricating material is a function of the number of revolutions of the disk 8 starting from the instant the clutch 15 is disengaged therefrom to the time the disk 8 comes to rest. If the ultraviolet lamp 34 has been energized, the lubricity of the lubricating material under test is a function of the number of revolutions of the disk 8 as counted by photocell 12 between two stroboscopic effects appearances. Lubricity measured in the latter manner is called "stroboscopic lubricity."

The method of operation of the apparatus of the invention will vary considerably, depending upon whether a lubricating oil or grease is to be tested. The following example (A) and (B) disclose the method of determining stroboscopic lubricity of lubricating oils and greases, respectively, after they were applied to the bearing 4 in the apparatus of the present invention.

(A) - Lubricating Oils

Before the bearing 4 is treated with the oil to be tested, it is washed in hexane or petroleum ether and dried by air. The bearing is then immersed in the oil to be tested and rotated slowly several times. The bearing 4 is then taken out of the oil, dripped for 5 seconds and mounted on the shaft 1 by keying it to the disk 8. The oiled bearing 4 is then "run-in" by rotating the disk 8 to a speed of 500 r.p.m. within a period of 5 seconds. This "run-in" operation results in a uniform distribution of the lubricant in the bearing. After the run-in operation has been completed and the disk 8 has stopped rotating, the bearing 4 is regulated to the desired temperature at which the lubricity of the oil under test is desired. After the temperature of bearing 4 has been regulated to a predetermined temperature the disk 8 is again rotated in the manner previously described and the ultraviolet lamp is turned on. The photocells 10 and 12 are then energized either manually or automatically when the first stroboscopic effect appears and they are deenergized after the appearance of the second stroboscopic effect. The revolution counter (not shown) connected to the photocell 12 automatically records the number of revolutions of the disk 8 between the two stroboscopic effects.

Through experimentation it has been found that in the case of lubricating oils, the lubricity is affected more by the nature of the mineral basis of the oil than it is by the viscosity of the oil. The following Table 1 discloses a comparison of two lubricating oils, neither of which contain additives, but both of which have identical viscosity, resulting from the fact that one has a paraffin basis and the other a naphthenic basis.

TABLE 1

| Viscosity | Oil | Pouring point | Stroboscopic Lubricity | | | | |
|---|---|---|---|---|---|---|---|
| | | | n | T | n | T | Δ% |
| 2.2°E/ 50°C | paraffinic | −17.5°C | 835 | 286 23°C | | −10°C | −64 |
| | naphthenic | −42.5°C | 754 | | 204 | | −73 |

In the above table, (n) indicates the number of output pulses of the photocell which were recorded by the counter and (T) indicates the temperature at which the bearing was thermostaticized.

As can be seen from Table 1, the pouring point is not a significant factor in the evaluation of the lubricity of a lubricating oil. It is also known that lubricating oils containing additives of the EP (extreme pressure) type result in oils having a lubricating character which is greater than those lubricating oils which have normal additives. As can be seen, the apparatus of the present invention supplies the type of information necessary for determining the precise quantity of an additive of the EP type which should be added to a lubricating oil in order that it not only have the desired anti-wear characteristics but also good lubricity. This type of information is shown by the data in the following Table 2. The following Table 3 presents information in the form of data which enables one to choose between two different additives to determine in addition to the one which has the best antiwearing properties, the one lubricating oil which has a better lubricity.

TABLE 2

| Oil | Additive | Stroboscopic Lubricity | | | | |
|---|---|---|---|---|---|---|
| | | n | T | n | T | Δ % |
| Naphthenic basis with a viscosity at 50°C of 2.78°E | | 602 | 23°C | 101 | −10°C | −83 |
| | 1 | 660 | 25°C | 160 | −10°C | −75 |
| | 3 | 675 | 25°C | 208 | −10°C | −69 |
| | 5 | 725 | 25°C | 204 | −10°C | −71 |
| | 10 | 824 | 25°C | 220 | −10°C | −73 |

TABLE 3

| Oil | Additive | | Stroboscopic Lubricity | | | | |
|---|---|---|---|---|---|---|---|
| | Type | % | T | n | T | n | Δ% |
| Naphthenic basis with a viscosity at 50°C of 2.78°E | A | 3 | 24°C | 962 | −10°C | 502 | −47 |
| | B | 3 | 24°C | 1014 | −10°C | 312 | −69 |

(B) - Lubricating Greases

In determining the lubricity of lubricating greases, the bearing 4 is carefully washed in the same manner as set forth with respect to example (A) above. The bearing is then carefully lubricated by inserting on its face a weighted quantity of grease which is uniformly distributed by the help of a metallic wire having a diameter of 1 mm and which has an end thereof which is slightly flattened. The "running-in" and the testing operations are then executed as previously described in example (A) above.

The apparatus of the present invention therefore provides useful information about the characteristics of lubricants in general to aid one in properly choosing the right lubricant for a particular type of mechanical coupling or the oil which has optimal lubricity between moving parts of a mechanical device. Further, the apparatus of the present invention provides information to enable one to determine the best type of additive and the proper quantity thereof in order to obtain a lubricant with the desired characteristics.

What is claimed is:

1. A method for evaluating the lubricity characteristics of oil and grease while under load and in motion comprising the steps of:
   a. lubricating a bearing with the lubricant to be tested;
   b. securing said bearing to the rotatable shaft of a stroboscopic disc;
   c. regulating the temperature of said bearing, said rotatable shaft and said disk to a predetermined value;
   d. rotating said disk by means of a disengageable clutch at a set speed for a predetermined time;
   e. disengaging said clutch to enable free-wheeling of said stroboscopic disk at a selected time and selected speed;
   f. illuminating said disk with a flashing light having a predetermined flash frequency and
   g. counting the number of revolutions of said disk during a period of time between two stroboscopic effects of said disk to indicate the lubricity of said lubricants.

2. The method according to claim 1 wherein said disk is rotated by said disengageable clutch for a period of 5 seconds at a speed of 500 r.p.m.

3. An apparatus for evaluating the lubricity characteristics of oils and greases comprising:
   a. a stroboscopic disk rotatably mounted on a shaft;
   b. motor-driven clutch means mounted adjacent said disk for rotating said disk upon engagement therewith;
   c. means connected to said shaft for moving said disk into and out of engagement with said clutch means said disk having a slot through said disk adjacent said periphery;
   d. a bearing mounted on said shaft and secured to said disk for receiving the lubricant to be evaluated;
   e. means for regulating the temperature of said disk, said shaft and said bearing;
   f. photoelectric means for producing an electrical impulse in response to the presence of said slot;
   g. means for illuminating said disk with a light pulsating at a fixed frequency for producing stroboscopic effects, and
   h. means energized by said electrical impulse produced in response to said slot for recording the number of revolutions of said disk in a time period between two stroboscopic effects of said disk after the disk is disengaged from the clutch means at a predetermined speed.

4. The apparatus according to claim 3, wherein said disk has radially extending teeth around the periphery thereof, and second photoelectric means for producing second electrical impulses in response to said teeth to determine the speed of said disk.

5. An apparatus according to claim 4 wherein said slot is 6 mm in width and describes an arc of 60° adjacent the periphery of said disk.

6. An apparatus according to claim 4 wherein said temperature regulating means comprises a cup around said disk, said shaft and said bearing for holding refrigerating liquid and a thermal layer around said cup.

7. An apparatus according to claim 4, wherein said selectively illuminating means comprises an ultraviolet ray lamp.

8. The apparatus according to claim 4 wherein the recording means connected to said photoelectric means is a graphic recorder.

* * * * *